July 2, 1929.  R. L. TULLIS  1,719,493
BIRD CAGE STAND
Filed June 1, 1925    2 Sheets-Sheet 1
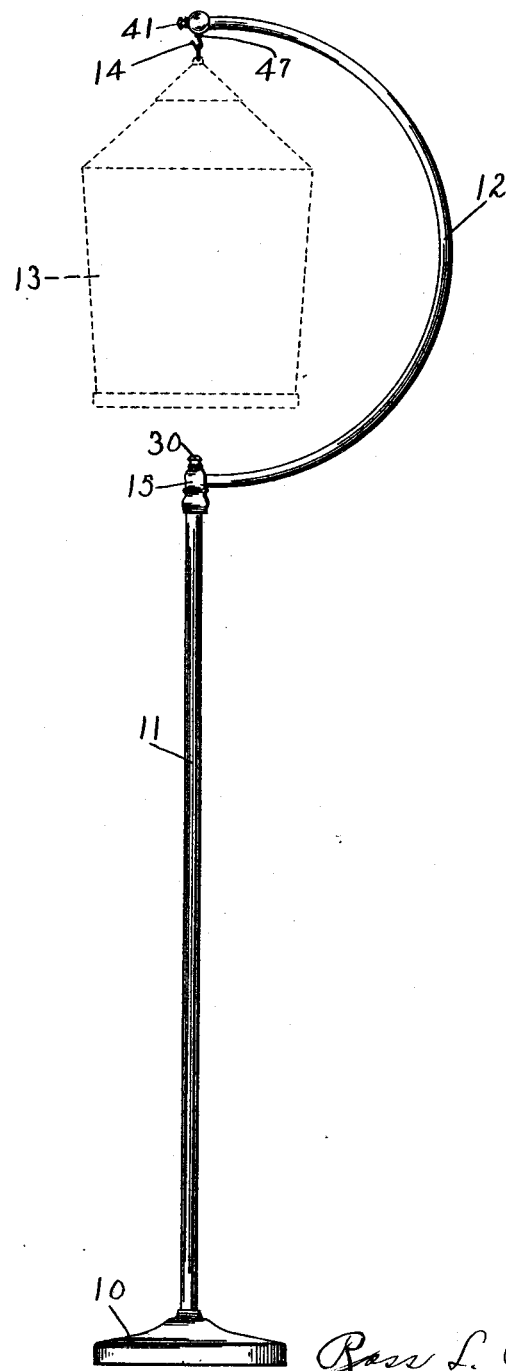
Fig.1.

July 2, 1929.  R. L. TULLIS  1,719,493
BIRD CAGE STAND
Filed June 1, 1925  2 Sheets-Sheet 2

Inventor
Ross L. Tullis
By Henry E. Rockwell
Attorney

Patented July 2, 1929.

1,719,493

UNITED STATES PATENT OFFICE.

ROSS L. TULLIS, OF NEW HAVEN, CONNECTICUT, ASSIGNOR TO THE ANDREW B. HENDRYX COMPANY, OF NEW HAVEN, CONNECTICUT.

BIRD-CAGE STAND.

Application filed June 1, 1925. Serial No. 34,139.

This invention relates to supporting stands, and more especially to a stand designed to support a bird cage in a suspended position.

Bird cages are at the present time made from a number of different materials and when the cages are used in connection with a stand, it is desirable that the latter be constructed of the same material as the cage in order that the two may harmonize in appearance, to enhance the ornamental effect of the cage and stand. Recently, it has been proposed to make bird cages of one of the cellulose esters, such as pyralin, and with a cage of this material which readily adapts itself to the use of contrasting colors, it is desirable that the stand be constructed of similar material, or at least have the appearance of such construction, which appearance may be obtained by covering with such material a stand having a frame of metal or other strong and relatively rigid substance.

One object of my invention, therefore, is to provide a stand having an exterior surface consisting entirely of one of the cellulose esters, such as pyralin.

Another object of the invention is the provision of a stand for bird cages or the like, possessing the strength and rigidity necessary for such structures and covered by one of the cellulose esters, such as pyralin.

A still further object of the invention is the provision of a stand for bird cages or the like, which shall be more pleasing in appearance than those made heretofore.

Another object of the invention is the provision of a bird cage stand of new and improved construction.

To these and other ends the invention consists in the novel features and combination of parts to be hereinafter described and claimed.

Figure 2:
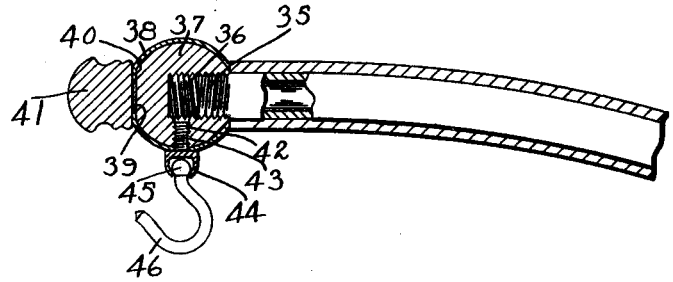
Figure 2:
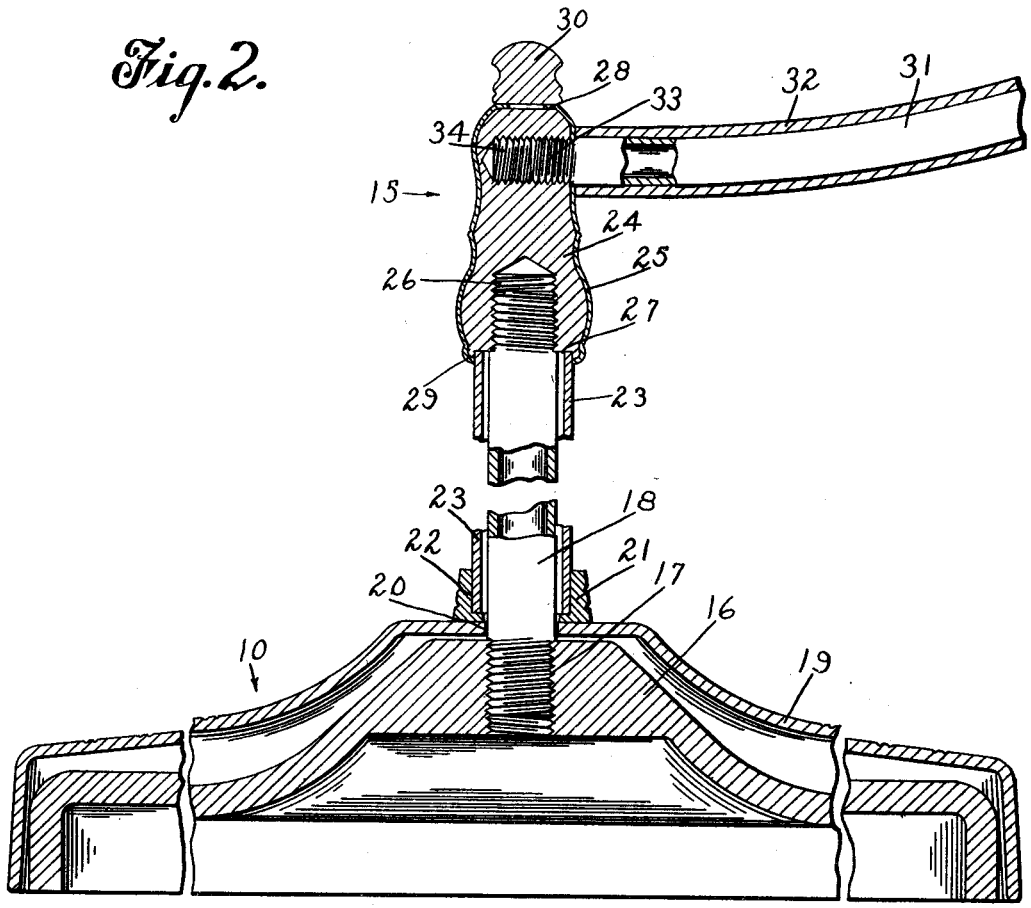

In the accompanying drawings:

Fig. 1 is a side elevational view of a bird cage stand, embodying my invention, and Fig. 2 is a broken sectional view through the stand, showing the manner of constructing the various parts thereof.

The stand which I have selected to illustrate and describe as a preferred embodiment of my invention, comprises generally speaking, a base 10 and an upright standard 11, secured to the base and having secured at its upper end a curved or arc shaped arm member 12, from which is suspended the cage 13 by means of a hook 14. As shown in the drawings, the upper curved portion 12 of the stand is connected to the upright 11 by means of a nipple 15, provided at the junction of these two parts and connected respectively thereto.

As shown in Fig. 2 of the drawings the base of the cage consists of a relatively broad flat member 16, which in the particular embodiment shown, is made of metal so that it will be relatively heavy and provide a stable support for the stand. This part of the stand may be conveniently made of cast iron, for example. Within a threaded opening 17 provided at the center of the base member is secured the threaded end of a rod or pipe 18, which likewise may be made of metal, and which forms the rigid frame or skeleton member of the upright 11.

A base cover or casing 19 is moulded or pressed from a sheet of material of one of the cellulose esters, such as pyralin, into a shape substantially conforming to that of the member 16, and provided with a central opening 20 to receive the pipe 18. When this member is placed over the pipe and upon the base, the latter is snugly covered thereby and presents the appearance of being formed of pyralin, although it is much heavier and stronger than if it were so formed, and at the same time, less expensive.

A collar 21 of pyralin is slipped over the pipe 18 to rest upon the upper surface of the casing 19, and is provided with a socket 22 to receive the lower end of a tube 23 also formed of pyralin, which encloses and covers the pipe 18.

The nipple 15 preferably consists of a brass or metal core 24, within a covering or casing 25 of pyralin, the core being provided with a threaded opening 26 to receive the upper end of the pipe 18, and also being counter sunk to provide a relatively shallow socket 27 to receive the upper end of the tube 23, so that the end of the tube will be concealed. It will be apparent that the lower end of this tube is likewise concealed by the collar 21, and the tube is effectually held in place between the nipple 15 and the base 10.

To secure the pyralin casing 25 upon the core 24, a tube of pyralin is provided which substantially fits the largest part of the core which is placed within the tube. The casing is then treated to render it plastic which may be done in several ways. A satisfactory method for this purpose, is to dip the casing into warm water which heats the pyralin and renders it sufficiently plastic so that by suitable means it may be drawn down upon the core to conform closely thereto. At the same time, and while in plastic condition, the ends 28 and 29 of the tube are turned over the ends of the core to a slight extent. The casing soon hardens after being removed from the water and provides a snugly fitting covering for the core which presents an appearance of being formed entirely of the cellulose ester substance.

A small portion of the upper end of the core 24 will be left uncovered, due to the opening in the tubular casing 25, and this may be covered by a solid tip 30 of pyralin, which may be formed in an ornamental shape and secured to the upper turned surface 28 of the casing by any suitable means such as welding by means of a solvent which dissolves the contiguous portions of the tips and casing 25 and causes such portions to unite.

The arm 12 of the stand consists of a tube or rod 31 of arcuate shape, which is slipped within a correspondingly shaped tube 32 of pyralin. The member 31 is provided with a threaded end 33, which is received in a threaded opening 34 of the core 24. The other end of the member 31 is similarly threaded as at 35, and is received within the threaded opening 36 of the core 37 of an ornamental terminal member for the stand. This core may be made of metal and is covered with a casing 38 of pyralin in the same manner as described in connection with the core 24 of the nipple 15, the core being placed within a short piece of pyralin tubing, and after the ends of the tubing are rendered plastic they are drawn down over the rounded surface of the core 37, which is substantially spherical in shape, so as to conform closely thereto. The outer pole 39 of the core 37 is slightly flattened, and the end 40 of the tube is turned over to lie flatly upon this portion of the core. The terminal member may then be finished by securing a tip 41 of pyralin to the outer surface of the turned portion 40 of the casing in any suitable manner, such as by the use of a solvent which welds the contiguous portions of the tip and casing, as hereinbefore described.

It will be understood that any one of a number of the cellulose esters may be used as well as pyralin, such as celluloid, fiberloid, visculcid, or any of the cellulose nitrate or acetate compounds.

It will be apparent that while the inner form or skeleton of the stand is made of metallic parts, and that the stand will be strong, rigid, and durable, at the same time it will be provided with a casing or surface of a composition which greatly enhances its appearance, which is capable of being given a high lustre, and of being used in contrasting colors. In practice, the covering of the base, the nipple, the upper terminal, and the collar 21 are provided of one color, while the tubular coverings of the upright standard and supporting arm are given a contrasting color to render the stand more ornamental. It will be understood, however, that I do not necessarily limit my invention to the use of a metal frame work or body for the stand, as conceivably this might be made of other material, if desired.

The core 37 of the upper terminal is provided with a threaded socket 42 to receive a stem 43 of a swivel cup 44. The mouth of this cup is closed in over a swivel ball 45 attached to a hook 46, from which the cage 13 may be suspended. By the use of this structure the hook 46 is swiveled to the stand so that it may be turned to any desired position without disturbing its threaded connection. The upper end of the cup 44 is preferably provided with wrench faces 47, by which it may be screwed tightly into the core 37.

While I have shown and described a preferred embodiment of my invention, it will be understood that same is not to be limited to all the details shown, but is capable of modification and variation within the spirit of the invention and the scope of the appended claims.

What I claim is:

1. A stand for bird cages or the like, comprising a frame consisting of a relatively broad and stable base portion, an upright secured to and extending substantially vertically from the base portion, and an arm secured to the upright, said arm being provided with means to suspend a cage therefrom, and a base, an upright, and an arm formed of an ornamental material, said elements being secured upon and designed to cover the corresponding parts of the frame.

2. A bird cage stand, comprising a frame consisting of a relatively broad heavy base and a standard secured thereto, said standard consisting of an upright and an arm secured thereto, the standard being made of relatively rigid and strong material, a base covering formed of an ornamental material and provided with a central opening to receive the standard when the parts are assembled so as to be secured thereby to said base, and tubes formed of the same ornamental material and being designed to be slipped over said upright and arm to conceal the material of the frame and give the stand an ornamental appearance.

3. A bird cage stand comprising a base portion, an upright secured to the base, and an arm, a nipple secured to the end of the upright and to the adjacent end of the arm, said nipple being made of metal and being covered by a cellulose ester, and coverings of cellulose ester for the base, upright and arm, the covering of the nipple receiving and concealing the adjacent end of the covering of the upright.

4. A bird cage stand comprising an upright portion and an arm portion, said parts being formed of a strong and rigid material, a nipple for connecting said parts, said nipple being encased within a tube of a cellulose ester substance, which closely conforms thereto, and coverings for the upright and arm, said coverings being made from a cellulose ester, and a tip of similar material on the upper end of the nipple.

5. A stand for bird cages or the like, comprising a base, an upright, and an arm secured together and covered with a cellulose ester substance, and means to suspend a bird cage from said arm, comprising a metallic member secured thereto, a hook secured in said metallic member, and a casing of a cellulose ester substance covering said member.

6. A terminal supporting element for bird cage stands, comprising a rounded member of strong and rigid material, said member being enclosed in an ornamental casing of a cellulose ester substance, a tip of the same substance secured upon one pole of the member, and a hook swivelly connected to the member.

7. A stand for bird cages or the like, comprising an upright standard and a supporting arm, a terminal element secured at one end to the end of said arm, said element having a curved lateral surface, and having its other end flattened, a casing of a cellulose ester substance covering the curved surface of said member, and a tip of a similar substance secured to and covering said flattened end.

8. A bird cage stand comprising a base, an upright secured to the base and an arm secured to the upright, a covering for the base of ornamental material, a tube of the same material enclosing the upright, means on the upright for concealing the ends of said tube and a tube of ornamental material enclosing said arm.

9. A bird cage stand comprising a base, an upright secured to the base, a covering for the base of ornamental material, a collar surrounding the upright above said covering and having an upwardly opening socket, a tube of ornamental material surrounding the upright, having its lower end received in the socket, a nipple on the upright, and an arm secured to the nipple, said nipple having an ornamental covering which conceals the upper end of the tube, and a second ornamental tube enclosing the arm and having its upper end concealed by an element of ornamental material.

10. In a bird cage stand, a hollow base of ornamental material, a flanged member of ornamental material carried on said base, a hollow upright of ornamental material having one end received within said flanged member, a hollow member of ornamental material on the upper end of said upright, and a rigid support carried within and concealed by said base, flanged member, upright, and hollow member, said support being formed separately from said members and being self supporting.

In witness whereof, I have hereunto set my hand this 28 day of May, 1925.

ROSS L. TULLIS.